United States Patent

[11] 3,614,619

| [72] | Inventors | Dean P. Huntsinger<br>Marion;<br>Michael W. Lundgreen, Cedar Rapids, both of Iowa |
|---|---|---|
| [21] | Appl. No. | 2,601 |
| [22] | Filed | Jan. 13, 1970 |
| [45] | Patented | Oct. 19, 1971 |
| [73] | Assignee | Collins Radio Company<br>Cedar Rapids, Iowa |

[54] DIGITAL CLOCK ACCURACY MONITOR
7 Claims, 3 Drawing Figs.

[52] U.S. Cl. ................................................. 324/78 Q,
328/138
[51] Int. Cl. ........................................... G01r 23/02
[50] Field of Search ......................................... 324/78 Q,
78 Z, 161; 328/138, 136

[56] References Cited
UNITED STATES PATENTS
2,931,979 4/1960 Uphoff et al. ............... 324/161
3,139,236 6/1964 Canova et al. ............... 324/161 X

*Primary Examiner*—Alfred E. Smith
*Attorneys*—Richard W. Anderson and Robert J. Crawford ABSTRACT: First and second clock sources are monitored on a digital basis by developing a gating pulse the width of which is proportional to the frequency of one of said oscillators and gating the second oscillator frequency to a binary counter for the duration of the gating pulse whereupon a predetermined count is effected in said counter corresponding to the nominal frequency of each of the oscillator sources. A decoder monitors the count in the binary counter and provides an output when the count corresponds to the nominal value. Deviation of either of the oscillators from its nominal frequency by over a predetermined percentage variation applies more or less pulses at the second oscillator rate to the counter. The total count entered into the counter during a calculation period is then at variance with the decoder and the absence of a decoder output depicts an out of frequency situation.

INVENTORS.
DEAN P. HUNTSINGER
MICHAEL W. LUNDGREEN

BY R. W. Anderson
AGENT

DIGITAL CLOCK ACCURACY MONITOR

This invention relates generally to monitoring devices and more particularly to monitoring the accuracy of a pair of oscillator frequencies one against the other using the same monitoring hardware.

In digital electronics equipment various digital computations are made under the control of one or more timing clocks. The timing clocks provide a train of accurately spaced pulses. Because various pulse encoding and decoding operations and digital counting operations are dependent upon the accuracy of the system timing clock, such equipments might well include a monitoring device by means of which the operator is appraised of the accuracy of the clock system employed. For example, in digitalized distance measuring equipment the discrete pulse space coding employed is operably dependent upon the accuracy of a clock source by means of which the encoding is effected. Further, in a digitalized distance measuring equipment the measuring of distance depends on a number of counts recorded in a distance controlled clock counter which advance one count for each pulse input from a further accurate clock source. In this instance the accuracy with which distance is measured is completely determined by and dependent upon the accuracy of the distance measuring clock source.

The present invention has a primary object thereof the provision of a simple monitoring arrangement by means of which a pair of clock sources, such as might be incorporated in a digitalized distance measuring equipment, may be monitored to provide the operator with a "go" or "no-go" indication dependent upon the accuracy of the clock sources.

A further object of the present invention is the provision of a clock accuracy monitor for a pair of oscillator frequencies which provides an alarm or indication when either one of a pair of oscillator frequencies deviates by a predetermined percentage from its nominal frequency.

The invention is featured in a means for monitoring a pair of oscillator frequencies with the same monitoring hardware rather than employing a completely dependent set of hardware for each of the clock sources. The monitor thus provides the desired operational characteristics while minimizing the hardware requirements, thus advantageously minimizing power, space, and weight requirements.

A further feature is the provision of a monitoring circuitry for a pair of oscillator frequencies which is completely binary in nature and in which a desired accuracy may be attained in percentage steps simply by increasing the length of binary counters employed in the monitoring system.

These and other features and objects of the present invention will become apparent upon reading the following description with reference to the accompanying drawings in which.

Figure 1:
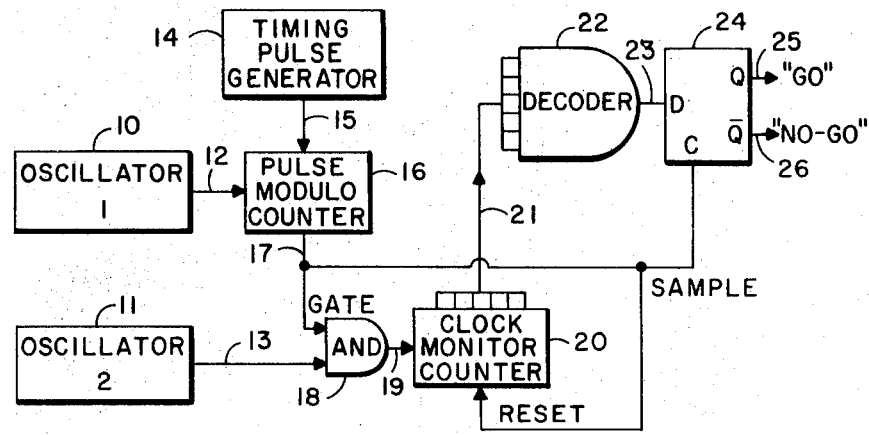
FIG. 1 is a functional block diagram of a digital clock accuracy monitor in accordance with the present invention.

The digital clock accuracy monitor of the present invention, as depicted in FIG. 1, is comprised basically of a pair of counters, two gates, and a binary or flip-flop. It operates on a cyclic basis under the control of periodic pulses from a timing pulse generator. In basic operation each pulse from the timing pulse generator initiates a gate the width of which is dependent upon the frequency of one of the oscillators. This is accomplished by a pulse modulo counter which might generally be defined as a pulse repetition rate to pulse width converter. Generally the gate is initiated by pulses from the timing pulse generator and terminated when a predetermined number of pulses from the oscillator are counted. Thus the width of the gate is established by the count capability of the counter and is thereby dependent on the frequency of the oscillator source applied. The second oscillator frequency is applied to a further counter during the interval of the pulse modulo counter gate. Thus the number of pulses applied to the second counter is a function of the frequency of the second oscillator as well as that of the first oscillator.

If then, both oscillator 1 and oscillator 2 are precisely "on" frequency, a predetermined number of pulses at the second oscillator rate will be applied to a clock counter. This number is fixed for a given pair of oscillator frequencies to be monitored and a decoder may be employed sense this fixed number at the end of each calculation—each calculation being initiated at the time of a timing pulse generator pulse and terminated at the conclusion or end of the pulse modulo counter gate. At this period of time the "yes" or "no" answer sensed by the decoder may be stored in a binary and the relative output level from the binary may indicate either a "go" or "no-go" situation depending upon whether the correct count was in the clock monitor at the conclusion of the calculation.

The above outlined general operating principle of the present invention is functionally embodied in FIG. 1 wherein a monitoring is performed on the operating frequencies of first and second oscillators 10 and 11. A timing pulse generator 14 provides a train or sequence of timing pulses 15 to a pulse modulo counter 16. Pulse modulo counter 16 counts a train of pulses 12 from oscillator 10 and converts the pulse repetition rate of the pulses 12 into a gate 17 the width of which is function of the frequency or repetition rate of oscillator 10. Gate 17 is applied to gate 18 to allow a predetermined interval of pulses 13 from the second oscillator 11 to pass to a clock monitor counter 20. The input 19 to the clock monitor counter is accordingly a predetermined number of pulses from oscillator 11 during the time occurrence of the gate 17 from pulse modulo counter 16. Clock monitor counter 20 counts the train of pulses 19. Considering that both oscillators 10 and 11 are operating at their precise frequencies, a predetermined number of pulses are applied to the clock monitor counter 20. This number of pulses, through an interconnection 21 with a decoder 22, is sensed by the decoder 22 and, if the calculation count in the clock monitor counter 20 is the correct count, the decoder 22 provides an output 23 in the form of a binary voltage level to indicate that the oscillators 10 and 11 are within their assigned tolerance. Decoder output 23 might be applied to a commercially available D flip-flop 24 to store the level. The decoder might comprise anynumber of implementations employing gates by means of which a predetermined number (as will be further discussed, a range of numbers) in the binary counter will produce a discrete output level from the decoder. If the output from the decoder as applied to the binary 24 is sampled at the conclusion of the calculation the D flip-flop output 25 indicates a "go" condition and the output 26 indicates a "no-go" condition, it being understood the outputs 25 and 26 correspond to the Q and $\bar{Q}$ output levels of the flip-flop.

Figure 2:
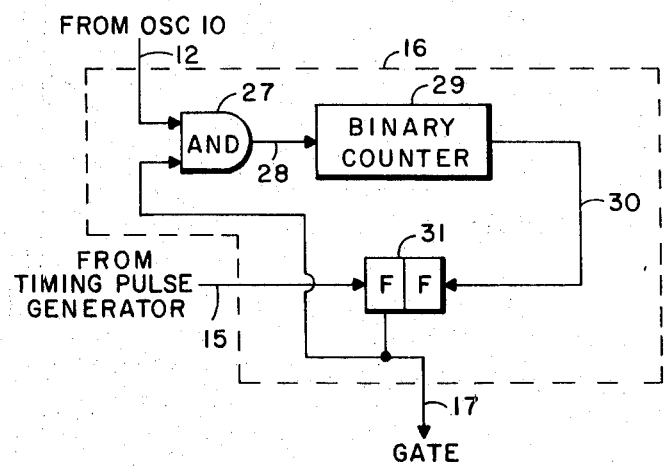
FIG. 2 is functional diagram of a pulse generating means which might be employed in the embodiment of FIG. 1.

FIG. 2 illustrates an implementation of the pulse modulo counter 16 of the FIG. 1 embodiment. As previously described, the pulse modulo counter is in essence a pulse repetition rate to pulse width converter in that it generates an output gate the width of which is dependent upon the periodicity of a train of pulses applied thereto. Accordingly, with reference to FIG. 2, the pulses 12 from oscillator 10 might be applied through an AND-gate 27 to a binary counter 29 comprised of $n$ stages such that it effects an output pulse when $2^n$ input pulses are applied. The output from the counter 30 might be applied to one stage of a flip-flop 31 as a triggering input. The pulses 15 from timing pulse generator 14 are applied to the other stage of the flip-flop 31, the output from which comprises gate 17 and is applied to enable gate 27.

In operation, the presence of a timing pulse 15 operates flip-flop 31 to generate the leading edge of the gate 17 which in turn opens the gate 27 to apply the pulses from oscillator 12 to the counter 29.

Counter 29 then begins to count the train of pulses, from oscillator 10 and after $2^n$ pulses are applied, an output pulse is obtained on line 30 which triggers the flip-flop 31 back to its initial state, thus terminating gate 17 and disabling gate 17 such that no further pulses are applied from oscillator 10. The gate 17 is then of a predetermined width which is a function of the frequency of oscillator 10 and the number of counts designed into counter 29.

The gate 17 (with reference again to FIG. 1) may be employed as the means for sampling the output binary 24 and also as a means for resetting the clock monitor counter 20 at the termination of the calculation. Though not specifically illustrated in FIG. 1 it is inferred here that the terminal edge of gate 17 would effect the sample and reset functions, thus FIG. 1 infers that the binary 24 and the clock monitor counter each include circuitry responsive to this particular change of state of the gate line 17.

Figure 3:
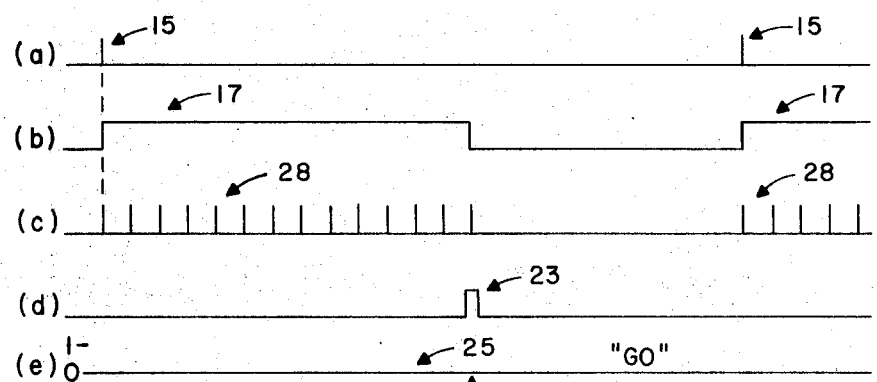
FIG. 3 is a diagrammatic representation of operational waveforms.

Operational waveforms are depicted in FIG. 3. Waveform (a) illustrates two successive pulses 15 from time pulse generator 14. Waveform (b) illustrates gate 17 being initiated at the time occurrence of a timing pulse and being concluded a predetermined time later (depending upon the frequency of oscillator 10 and the number of stages in the pulses modulo counter). Waveform (c) illustrates the train of oscillator 11 pulses which are applied to the clock monitor counter 20 during the calculation interval. Waveform (d) illustrates the behavior of decoder output 23 under a "go" condition. Waveform (e) illustrates the output 25 of D flip-flop 24. At the sample time, the D flip-flop looks at the decoder output and stores the result. The FIG. 3 example shows a case where the previous cycle was "go" and the present cycle is "go." The purpose of the D flip-flop is to prevent the "go"-"no-go" indication from varying. Should this have been a "no-go" situation, the decoder output 23 would not have been present at the sample time and the D flip-flop would have stored a "no-go" indication and continued to do so as long as the decode is absent at the sample time on successive cycles.

FIG. 3 graphically illustrates that the number of pulses applied to the clock monitor during a calculation interval is a function of the operating frequencies of both oscillators 10 and 11. As previously described, and as emphasized here, the width of gate 17 is a function of the frequency of oscillator 10. The number of pulses from oscillator 11 applied to the clock monitor counter 20 during this gate interval is a function of the frequency of oscillator 11. Thus the number of counts entered into the clock monitor counter during each calculation period is a function of the operating frequencies of both of the oscillators.

The above discussion indicates that the clock monitor counter 20 is reset at the conclusion of each calculation which is defined in turn by the termination of the gate 17. This reset action may be arbitrarily designed to reset the clock monitor counter 20 to zero, or it may reset the counter 20 to some predetermined number and thus be a preset function. This feature is arbitrary as concerns the operation of the monitor and generally a preset number may be put into a clock 20 from which it starts counting oscillator 11 pulses, such that the fixed count in the counter 20 at the conclusion of the calculation is actually a number of oscillator 11 pulses plus the preset number in the clock. This expedient can be tailored for a particular situation in the interest of simplifying the implementation of decoder 22, since some numbers when being monitored on a binary basis are easier to monitor or decode than others. Thus for any particular oscillator frequency to be monitored and, as will be further explained, for a particular degree of accuracy to be built into the monitor (that is, what percentage deviation can one or the other of the oscillators 10 and 11 deviate before a "no-go" output is indicated) a predetermined fixed number of counts will be applied to clock monitor counter 20 during each calculation period. If this particular number for a particular design is cumbersome as concerns decoder implementation, the clock monitor counter can be preset to some predetermined count which, when added to the defined number of clock pulses applied, arrives at an "answer" number which is more convenient to decode.

The accuracy of the monitor is defined as two parts out of the number of pulses gated to clock monitor counter 20 during each calculation period. Because the two oscillators 10 and 11 will not be in synchronism, the decoder will need to decode at least two numbers. This action defines the accuracy as two parts out of the number of pulses gated to counter 20 rather than one part out of the number of pulses gated to the counter. This may be illustrated by considering a specific example which will bear out the fact that the monitor of this invention can be designed to any desired accuracy simply by increasing the length of the counters employed, that is, by applying more pulses during each calculation interval the accuracy increases proportionally.

In a distance measuring equipment of digital nature into which the monitor has been embodied, oscillator 1 comprises an 809 kHz. source which is used in the system to count distance. Oscillator 11 comprises a 1/3 MHz. clock which is employed in pulse encoding and decoding functions. It is accordingly imperative that these two sources be extremely accurate and the monitor is employed to appraise the operator that these sources are in fact on frequency. Pulse modulo counter 16 might employ a counter 29 as depicted in FIG. 2 capable of counting to 1,000 in which case the width of gate 17 is 1,000 clock periods long at the 809 kHz. clock rate. This defines, in turn, a gate 1,236 microseconds long which corresponds to 412 periods of the oscillator 11 frequency of one third MHz. Considering for the moment that the clock monitor counter 20 is preset to a count of 98, the correct number to be counted during each calculation interval in clock monitor counter 20 would be 412 plus 98 or 510. Since asynchronous clocks are employed, the correct number then becomes either 509 or 510. It may be shown that one clock pulse out of 412 corresponds to approximately one'-fourth of 1 percent accuracy. Therefore, if either the ⅓-MHz. oscillator 11 or the 809 kHz. oscillator 11 deviates by one-fourth percent or more the count in clock monitor counter 20 will not be between 508 and 511, these accounts being those which satisfy decoder 22. It might be noted that one of the two oscillators might be ±one-fourth percent. The other oscillator could then deviate ±one-half percent before alarm. The arrangement, therefore, actually checks clock accuracy to approximately one-half percent for this illustrative example for each individual clock. Since the accuracy is defined percentage wise as the ratio of two counts to the number of counts applied to the counter 20 during each calculation, it follows that the accuracy for any given embodiment may be increased by increasing the number of counts applied to counter 20. This in turn implies that the pulse modulo counter 16 count to a correspondingly higher number so as to generate a proportionally wider gate 17 and thus allow more pulses from oscillator 11 to be applied to clock counter 20 during each calculation.

Although no restrictions are placed on the relative application of the two oscillators to the monitor, in general, the lower frequency of the two is preferably that applied through the AND-gate 18 to counter 20 since the lower the count in counter 20 the simpler the decoding operation becomes.

The present invention is thus seen to provide a monitor for determining deviation of first and second oscillators from nominal frequencies which employs s common monitoring system for the two oscillators. When either of the oscillators deviates from nominal by a predetermined percentage, the monitor provides an output indication to warn of a "no-go" condition.

Although the present invention has been described with respect to a particular embodiment thereof, it is not to be so limited as changes might be made therein which fall within the scope of the invention as defined in the appended claims.

We claim:

1. Means for monitoring the operating frequencies of first and second oscillators comprising pulse generating means for generating a gate the duration of which is dependent on the frequency of said first oscillator, binary counting means, means for passing the output of said second oscillator to the input of said binary counting means for the duration of said gate, decoding means, said decoding means operably connected with said binary counting means and providing an output of first binary level when the count in said binary counting means as applied to said decoding means exhibits predetermined counts, said decoding means providing an output of second binary level for input counts other than said predetermined ones, and means sampling the output of said decoding means at the termination of said gate to provide an output the binary level of which is indicative of the correlation between the count exhibited by said binary counting means at the termination of said gate and said predetermined counts.

2. Monitoring means as defined in claim 1 comprising a source of timing pulses in response to which said gate is repetitively generated on a predetermined cyclic basis.

3. Monitoring means as defined in claim 2 further comprising means to reset said binary counting means to a predetermined count at the conclusion of each successive gating period, means to effect said sampling of the output of said decoding means at the termination of each successive gating period, and means storing the binary level defining said sampled output between successive cycles as defined by said timing pulses.

4. The monitoring means as defined in claim 3 wherein said pulse generating means comprises a pulse repetition rate to pulse width converter means, the output from said first oscillator being applied to said converter means and an output from said converter means comprising said gate the duration of which is proportional to the frequency of said first oscillator.

5. A monitor means as defined in claim 4 wherein said converting means comprises a gating means, a further binary counter operable to provide an output pulse when a predetermined number of input pulses are applied thereto, the output of said further counting means being applied to a first stage of a flip-flop, the output from said timing pulse generating means being applied to a second stage of said flip-flop, and an output from said second stage being applied as an enabling gate to said AND gate and further constituting the output of said converter means.

6. A monitoring means as defined in claim 3 wherein said binary counting means receiving the output from said second oscillator is adapted to be preset to a predetermined count other than zero in response to successive ones of said reset pulse means, said decoding means being adapted to provide a predetermined output when the number of pulses in said binary counting means effects a count corresponding to said predetermined number of pulses from said second oscillator means added to said preset count.

7. A monitoring means as defined in claim 3 wherein said output sampling means comprises first and second flip-flops the first of which is switched to a predetermined conduction state in response to an output from said decoding means and the second of which is switched to a conductive state like that of said first flip-flop upon the application of a sampling gate being applied, and subsequent conductive state changes in said first flip-flop being ineffective in changing the conductive state of the second flip-flop stage, the application of said sampling gate thereby effecting a sampling and storage of the output of said decoder at the conclusion of each successive cycle.